United States Patent [19]
Olsen et al.

[11] Patent Number: 5,595,837
[45] Date of Patent: Jan. 21, 1997

[54] PROCESS FOR PRELITHIATION OF CARBON BASED ANODES FOR LITHIUM BATTERIES

[75] Inventors: Ib I. Olsen; Rene Koksbang, both of Henderson, Nev.

[73] Assignee: Valence Technology, Inc., Henderson, Nev.

[21] Appl. No.: 422,185

[22] Filed: Apr. 12, 1995

[51] Int. Cl.$^6$ .................................................. H01M 10/40
[52] U.S. Cl. ......................... 429/194; 29/623.1; 205/59; 429/218
[58] Field of Search ................................ 429/194, 218, 429/224; 423/179.5, 460; 29/623.1, 623.5; 205/59

[56] References Cited

U.S. PATENT DOCUMENTS

| | | | |
|---|---|---|---|
| 5,028,500 | 7/1991 | Fong et al. | 429/194 |
| 5,162,176 | 11/1992 | Herr et al. | 429/194 |
| 5,436,093 | 7/1995 | Huang et al. | 429/218 X |

*Primary Examiner*—Anthony Skapars
*Attorney, Agent, or Firm*—Charles Jew

[57] ABSTRACT

A method of increasing the amount of alkali metal that is available during charge/discharge of an electrochemical cell that employs carbon based intercalation anodes is provided. The method comprises of prealkaliation of the carbon anode. By subjecting the anode carbon to the prealkaliation process prior to packaging the electrochemical cell, substantially all the alkali metal (e.g., lithium) which is originally present in the cathode will be available for migration between the anode and cathode during charge/discharge.

42 Claims, 1 Drawing Sheet

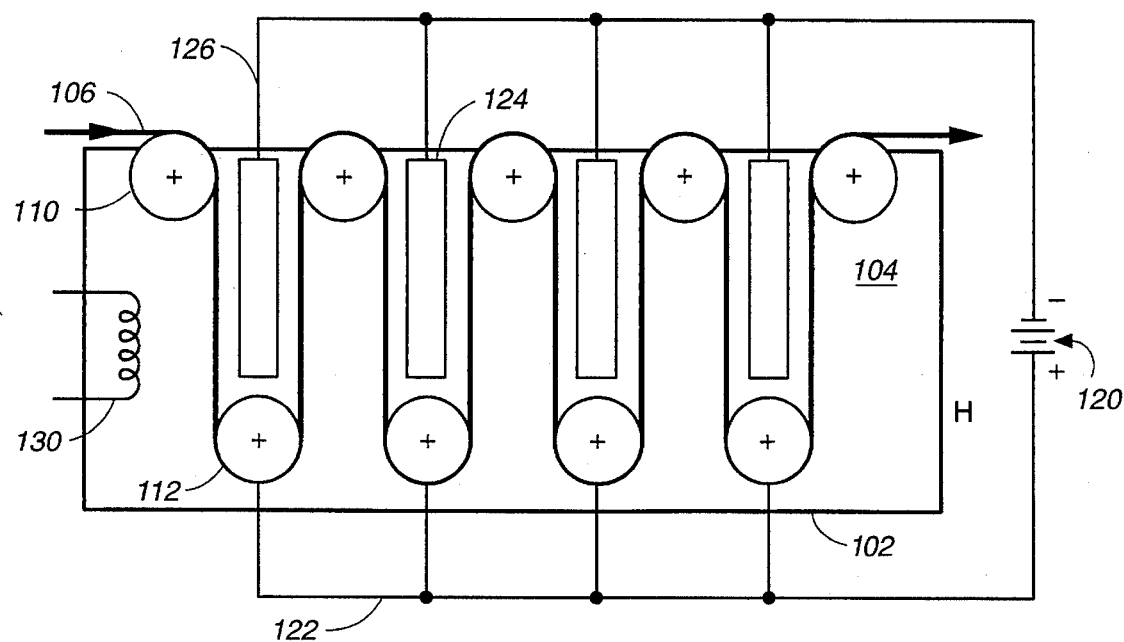
FIG._1

PROCESS FOR PRELITHIATION OF CARBON BASED ANODES FOR LITHIUM BATTERIES

FIELD OF THE INVENTION

The present invention relates to solid electrochemical devices and, more particularly, to a method of fabricating an electrochemical cell having improved energy density.

BACKGROUND OF THE INVENTION

Electrochemical cells containing an anode, a cathode and a solid, solvent-containing electrolyte are known in the art and are usually referred to as "solid batteries." See, for instance, U.S. Pat. Nos. 5,229,225, 5,238,758, 5,358,801, and 5,366,829. These cells offer a number of advantages over electrochemical cells containing a liquid electrolyte (i.e., "liquid batteries") including improved safety features.

Non-aqueous lithium electrochemical cells typically include an anode of metallic lithium, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active material through the electrolyte and are plated back onto the lithium anode.

During each discharge/charge cycle small amounts of lithium and electrolyte are consumed by chemical reactions at newly created surfaces. As lithium inherently tends to form high surface area peaks or dendrites as it is plated back onto the anode, this reactive condition is aggravated. Furthermore, the dendritic peaks continue to grow until they eventually contact the cathode which causes the cell to fail. Additional amounts of lithium do not cohesively plate onto the anode during the charge cycle and result in the formation of spongy deposits near the anode surface. As these deposits are not in electrically conductive contact with the anode, they eventually detract from the capacity of the cell.

One approach to this problem has been to replace the lithium metal anode with a carbon anode such as coke or graphite intercalated with lithium metal to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode cannot occur even under abuse conditions. Also, because lithium is reincorporated into the anode by intercalation rather than by plating, dendritic and spongy lithium growth cannot occur.

The use of carbon anodes however is not without problems. As $Li_xC$ is a reactive material which is difficult to handle in air, it is preferably produced in-situ in a cell. In doing so, some of the lithium and carbon are consumed in an irreversible process. This irreversible process results in an initial capacity loss for the cell which reduces the cell's overall performance. Furthermore, the cell often exhibits a progressive loss of capacity over numerous charge/discharge cycles. This progressive loss is commonly referred to as "capacity fade."

In view of the above shortcomings associated with the prior art, there is a need for solid state electrochemical devices that are capable of providing improved cycle life, capacity, and rate capability.

SUMMARY OF THE INVENTION

The present invention relates to a method of increasing the amount of alkali metal that is available during charge/discharge of an electrochemical cell that employs intercalation based carbon anodes. The inventive process can be implemented on a continuous or batch basis.

In one method aspect, the invention is directed to a method for fabricating an electrochemical cell which comprises the steps of:
  (a) preparing a carbon anode in a process comprising of:
    (i) providing a carbon material that is capable of intercalating alkali metal; and
    (ii) prealkaliating the carbon material with alkali metal;
  (b) providing a cathode; and
  (c) forming a solvent-containing electrolyte that is interposed between said anode and said cathode.

In a preferred embodiment, the alkali metal is lithium and prealkaliation (i.e., prelithiation) comprises of polarizing the carbon material in a galvanic cell. In addition, the intercalated alkali metal, e.g., lithium, can be removed after prealkaliation.

The invention is also directed at electrochemical cells and batteries fabricated by the inventive process.

With the present invention, by subjecting the anode carbon to the prealkalization process prior to packaging the electrochemical cell, substantially all the alkali metal (e.g., lithium) originally incorporated in the cathode when the cell is packaged, for instance, will be available for migration between the anode and cathode during charge/discharge.

BRIEF DESCRIPTION OF THE DRAWINGS

FIG. 1 is a schematic side view of an illustrative galvanic cell device for prelithiating an intercalation based carbon anode.

DETAILED DESCRIPTION OF THE PREFERRED EMBODIMENTS OF THE INVENTION

The present invention is directed to a method of fabricating a rechargeable electrochemical device, particularly an electrochemical cell and battery, that includes: a cathode, an intercalation based carbon anode, with each electrode capable of reversibly incorporating (i.e., intercalating) an alkali metal, alkali metal incorporated in at least one the electrodes, and a solid electrolyte comprising an organic solvent and a salt of the alkali metal. Particularly preferred electrochemical cells and batteries use lithium metal and salts thereof. An important aspect of the invention is that the carbon material of the anode is prealkaliated (e.g., prelithiated) prior to packaging thereby increasing the amount of alkali metal (e.g., lithium) that is available during charge/discharge of the electrochemical cell or battery.

However, prior to describing this invention in further detail, the following terms will be defined.

The term "solid polymeric matrix" or "solid matrix" refers to an electrolyte and/or composite electrode compatible material formed by polymerizing an inorganic or organic monomer (or partial polymers thereof) and which, when used in combination with the other components of the electrolyte or the composite electrode, renders the electrolyte or composite electrode solid. The solid matrix may or may not be ion-conducting. Preferably, however, the solid matrix is capable of ionically conducting inorganic cations (e.g., alkali ions). When employed to form the electrolyte or the composite electrode, the solid matrix forming monomer is preferably polymerized in the presence of the alkali salt and the electrolytic solvent to form solid matrices which are suitable for use as solid electrolytes or composite electrodes in electrolytic cells.

Suitable solid polymeric matrices are well known in the art and include solid matrices formed from inorganic polymers, organic polymers or a mixture of polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413 which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499; 4,388,385; 4,414,607; 4,394,280; 4,432,891; 4,539,276; and 4,557,985 each of which is incorporated herein by reference.

The term "a solid matrix forming monomer" refers to inorganic or organic materials which in monomeric form can be polymerized to form solid polymeric matrices. Suitable solid matrix forming monomers are well known in the art and the particular monomer employed is not critical. Preferably, the solid matrix forming monomers contain hetero atom functionalities capable of forming donor acceptor bonds with the cations of the alkali salt so as to render the solid matrix ion-conducting (i.e., able to conduct the alkali cations). Ion-conducting hetero atom functionalities in solid polymeric matrices include, by way of example, ether groups, amine groups, and the like. On the other hand, non-conductive solid matrix forming monomers can also be used herein including, by way of example, monomers not containing hetero atoms and monomers containing non-conductive hetero atom functionalities such as carboxylic acid groups, sulfonic acid groups, and the like. The latter are non-conductive because they strongly bind the alkali cation.

Examples of suitable solid matrix forming monomers include, by way of example, ethyleneimine, ethylene oxide, epichlorohydrine, acryloyl-derivatized polyalkylene oxides (disclosed in U.S. Pat. No. 4,908,283, which is incorporated herein) urethane acrylate, vinyl sulfonate polyalkylene oxides (as disclosed in U.S. Pat. No. 5,262,253 and incorporated herein), acrylic acid, chloroacrylic acid, bromoacrylic acid, crotonic acid, propylene, ethylene and the like as well as mixtures thereof.

Examples of suitable inorganic solid matrix forming monomers include, by way of example, phosphazines and siloxanes. Phosphazine monomers and the resulting polyphosphazine solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized to form solid polymeric matrices.

The term "prepolymer" refers to solid matrix forming monomers and/or partial polymers thereof.

The term "cured" or "cured product" refers to the treatment of prepolymers under polymerization conditions so as to form a solid polymeric matrix. The resulting cured product can include cross-linking between polymer backbones. Suitable polymerization conditions are well known in the art and include by way of example, heating the monomer, irradiating the monomer with UV light, electron beams, etc. Examples of cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the alkali salt and the electrolytic solvent. For example, a composition comprising requisite amounts of the solid matrix forming monomer, alkali salt and electrolytic solvent can be applied to a substrate and then cured. Alternatively, the solid matrix forming monomer can be first cured and then dissolved into a suitable volatile solvent. Requisite amounts of the alkali salt and electrolytic solvent can then be added. The mixture is then placed on a substrate and removal of the volatile solvent results in formation of a solid electrolyte. In either case, the resulting solid electrolyte is a homogeneous, single phase product which is maintained upon curing or evaporation, and does not readily separate upon cooling to temperatures below room temperature. Accordingly, the solid electrolyte of this invention does not include a separator as is typical of liquid electrolytes.

The term "compatible electrolyte solvent," or "electrolytic solvent," or in the context of components of the solid electrolyte, just "solvent," is a low molecular weight organic plasticizer added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as propylene carbonate, ethylene carbonate, gamma-butyrolactone, glyme, diglyme, triglyme, tetraglyme, dimethylsulfoxide, dioxolane, sulfolane, and the like. A particularly preferred solvent is disclosed in U.S. Pat. No. 5,262,253, which is incorporated herein.

The term "salt" refers to any salt, for example, an inorganic salt, which is suitable for use in a solid electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $Li[N(SO_2CF_3)_2]$, $LiCF_3SO_3$, $LiPF_6$, $NaSCN$, and the like. The inorganic ion salt preferably contains at least one atom selected from the group consisting of Li, Na and K.

The term "electrochemical cell" or "electrolytic cell" refers to a composite structure containing an anode, a cathode, and an ion-conducting electrolyte interposed therebetween.

The term "battery" refers to two or more electrochemical cells electrically interconnected in an appropriate series/ parallel arrangement to provide the required operating voltage and current levels.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black. With the present invention, the intercalation based anode comprising carbon material that have undergone prelithiation as described below is particularly preferred.

When employing intercalation based carbon anodes, it is known that a portion of the carbon material will react irreversibly with the alkali metal (e.g., lithium) and other components (e.g., electrolyte) when the electrochemical cell is initially charged after the cell has been packaged. The percentage of the carbon material undergoing this reaction depends on the source of carbon (e.g., coke) and this percentage can range from about 10% to about 50%, or more. Other factors influencing this percentage include the particular alkali metal, the electrolyte solvents and salts employed and the charging and discharging current and voltages. For Mitsubishi Gas Carbon™ approximately 30 to 40% of the carbon will react irreversibly with lithium. Generally, the percentage of carbon reacting irreversibly increases with temperature.

After the initial charge, subsequent recharges (following each discharge of the cell) do not result in further appreciable lost of lithium. The exact nature of the reaction is not known but results in the lost of a considerable amount of carbon material and lithium. As is apparent, a significant portion of the original lithium present in the cathode, for instance, is sacrificed upon charging the electrochemical cell thereby reducing the cell's energy density and capacity. With the inventive prealkaliation process, carbon material to be used in the anode is subject to this irreversible reaction with the alkali metal available from an external source. In the case of electrochemical cells employing lithium, for instance, the carbon material is reacted with lithium before the anode, cathode, and solid electrolyte are incorporated to form the cell. Thus, when this prealkaliated anode is employed, practically all the lithium initially in the cathode (e.g, in the form of $LiMn_2O_4$) becomes available not only for the initial charging but also subsequent discharges/charges as well.

The term "prealkaliation" refers to a process whereby the carbon anode material is exposed to alkali metal or ions under conditions that would cause a portion of the carbon to undergo the above described irreversible reaction with the alkali metal. During the prealkaliation process a portion of the alkali metal will be intercalated in the carbon anode. Intercalated alkali metal can be readily removed whereas metal having undergone the irreversible reaction cannot be. For example, some or essentially all the intercalated metal can be removed from the carbon anode following the prealkaliation process prior to packaging into an electrochemical cell. The process can be implemented on a batch, continuous or semi-continuous basis. Prealkaliation is conducted prior to packaging the electrochemical device and particularly prior to the initial charge/discharge of an electrochemical cell or battery. One prealkaliation method that is described further below involves polarizing a carbon anode in a galvanic cell. Conceptually, any technique that can simulate the charging of an carbon anode can be employed. Another method described herein is to simply short circuit a carbon anode and a lithium counter electrode. A less preferred prealkaliation method is to expose the carbon material to a solution containing a highly reactive alkali salt. For example, a solution of lithium and benzophenone or lithium and naphthalene may be sufficiently reactive to react reversibly and irreversibly with the carbon due to the presence of the electron acceptors. Most preferably, prealkaliation produces a carbon anode, which prior to packaging into an electrochemical cell, already has substantially the same percentage of carbon irreversibly bonded to alkali metal (e.g., lithium) that prior art anodes had after the initial charge following packaging.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$, lithiated manganese oxides, e.g., $LiMn_2O_4$, lithiated nickel oxides, e.g., $LiNiO_2$, and the like.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like.

Methodology

An illustrative prealkaliation, e.g., prelithiation, technique employs a galvanic cell shown schematically in FIG. 1 which comprises a reactor enclosure 102 containing a lithium salt liquid electrolyte 104. The electrolyte is heated or cooled by conventional means represented by heating/cooling coil 130. Web 106 which comprises a laminate of carbon anode material coated on an electrically conductive substrate is fed through the electrolyte bath 104 using rollers 110 and electrically conducting rollers 112. Rollers 112 are in electrical contact with power supply 120 through wires 122. The carbon anode of the web and the counter electrode 124 are in ionic contact through the electrolyte and are in electrical contact through the electrically conducting rollers 112, wires 122, the power supply 120, and wires 126. In one embodiment, the substrate of the web can be the current collector for the anode.

The speed at which the web is fed through the electrolyte is determined primarily by the amount of carbon per unit area, the type of salt (e.g., lithium) and electrolyte (e.g., propylene carbonate, ethylene carbonate, and other suitable organic solvents), the applied current or potential and the temperature of the electrolyte. Selection and optimization of the operating parameters for a particular speed can be achieved by a person skilled in the art. As is apparent, the speed should be slow enough so that the residence time of the web in the electrolyte is sufficient to allow the irreversible reactions to come to completion.

The power supply will either be maintained at a constant potential between the web (i.e., carbon anode) and the counter electrode (e.g., lithium) by adjusting the current (potentiostatic mode), or it will be maintained at a constant current that is sufficient to fully discharge the carbon anode during the residence time in the reactor (galvanostatic mode). The constant potential in the potentiostatic mode and the current in the galvanostatic mode will also depend primarily on the amount of carbon per unit area, the type of carbon, the type of electrolyte, and the temperature.

In the case of prelithiation, the counter electrode reaction will be:

$$Li^\circ \rightarrow Li^+ + e^-.$$

The carbon electrode reaction undergoes two types of reactions: (1) the reversible (i.e., intercalation) electrode reaction utilized in the cell or battery: $Li^+ + e^- + C_6 \rightarrow Li_xC_6$ and (2) the irreversible reaction with carbon surface impurities, electrolyte impurities, and carbon catalyzed electrolyte decomposition, which yields a combination of lithium covalent bonded to the carbon surface and ionic bonded in solid ionic conducting surface layers, and solid, liquid, and gaseous byproducts. The nature of the irreversible reactions will depend on the type of carbon, the type of electrolyte, and the temperature. The final prelithiated coating may be reactive towards oxygen and moisture and therefor should be kept in an inert atmosphere (e.g., argon or nitrogen) until assembled into an electrochemical device.

To reduce the reactivity of the prelithiated coating, it can be processed through a second galvanic bath with the same components as the first bath, but applying the current, in the reverse direction. This causes some or substantially all the intercalated lithium to be removed from the carbon material. Thus, effectively only alkali that has irreversibly reacted with the carbon material remains.

Another prealkaliation method comprises short circuiting the anode coating and the lithium counter electrode. The advantage of this method is that since the potential of the anode does not fall below 0 V relative to lithium, metallic lithium does not plate onto the anode surface. The disadvantage is that there is less control of the exact amount of lithium used for the prealkalation.

Employing this procedure, an anode comprising Mitsubishi Gas Carbon was prelithiated. The prelithiation electrolyte was a 1 molar electrolyte solution of $LiPF_6$ in ethylene carbonate/dipropylene carbonate (Grant Ferro Chemical, Baton Rouge, La.)/dipropylene methyl acetate (Arco Solv, Newton Square, Pa.) 8/2/5 wt/wt/wt. The carbon anode was incorporated into an electrochemical cell employing this electrolyte and metallic lithium as the counter electrode. The cell was then equilibrated at various temperatures and subsequently short circuited for different lengths of time. Any means of electrically connecting, i.e., short circuiting, the carbon anode material to the counter electrode can be employed. Electrochemical cells were then manufactured using the prelithiated carbon anodes in the Example described in detail hereinbelow. The cells were tested to determine the first cycle capacity loss. The procedure for this test was to first fully charge each cell after being assembled and then discharge each cell and measure the capacity loss. The data is set forth in the following table. The charge current was 0.2 mA/cm$^2$ and the discharge current was 0.2 mA/cm$^2$. The voltage limits were 4.1 and 2.5 volts.

As is apparent from the data, the longer the prelithiation time employed, the smaller the capacity loss experienced by the electrochemical cell. The data suggest that a sufficient amount of time is required to permit the irreversible reaction that occurs between some of the carbon of the anode and lithium to come to completion. The data also suggests that rate of the prealkaliation reaction can be increased by raising the operating temperature. As a comparison, electrochemcial cells fabricated with carbon anodes that did not undergo prelithiation had first cycle capacity losses of 35 to 40%.

|  | CAPACITY LOSS (Prelithiation time) | | | | | | | |
|---|---|---|---|---|---|---|---|---|
| Temp. | 5 secs | 15 secs | 30 secs | 1 min | 2.5 min | 5 min | 10 min | 15 min |
| 23° C. | 40 ± 1 | 35 ± 1 | — | 31 ± 1 | — | 15 ± 1 | — | 10.5 ± 2.5 |
| 50° C. | 39 ± 1 | 37 ± 1 | 41 ± 1 | 33 ± 1 | 24 ± 10 | 15 ± 6 | 12 ± 0.5 | 12 ± 4 |
| 75° C. | 38 ± 1 | 33 ± 1 | 30 ± 1 | 23 ± 1 | 15 ± 2 | 14 ± 2 | 10 ± 2 | 12 ± 1 |
| 100° C. | 26 ± 3 | 13 ± 2 | 12 ± 2 | 7.7 ± 1 | 8.7 ± 1 | 0 | 0 | 0 |

Generally, the prealkaliation (e.g., prelithiation) conditions employed will vary depending, for instance, on the carbon anode material and alkali metal. Preferably the selected process conditions of the prealkaliation step are such that following treatment the carbon material produced has the same amount of irreversibly loss alkali metal (e.g., percentage of lithium that reacts irreversibly with the carbon) that an untreated carbon material would have in the electrochemical device. In other words, the prealkylation process conditions will also depend on the particular electrochemical device. A person skilled in the art with the benefit of this disclosure can readily determine (and optimize) the process conditions needed to produce a treated carbon having a predetermined amount of irreversibly reacted alkali metal.

A preferred method of fabricating an electrochemical cell is described herein. In addition, methods for preparing solid electrochemical cells and batteries are described in the art, for example, in U.S. Pat. Nos. 5,300,373, 5,316,556, 5,346,385, 5,262,253 and U.S. patent application Ser. No. 07/918,509 filed Jul. 22, 1992; Ser. No. 08/049,212, filed Apr. 19, 1993, which are all incorporated herein in their entirety.

In one preferred embodiment, the cathode is prepared from a cathode paste which comprises from about 35 to 65 weight percent of a compatible cathodic material; from about 1 to 20 weight percent of an electroconductive agent; from about 0 to 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

The following Example illustrates a method of how an electrolytic cell could be fabricated.

EXAMPLE

A solid electrolytic cell is prepared by first preparing a cathodic slurry which is spread onto a current collector. An electrolyte solution is then placed onto the cathode surface and the cathode slurry and electrolyte solution are simultaneously cured to provide for a solid electrolyte composition. Similarly, an anode composition is placed on a current collector cured and then subject to pre-lithiation as described above. Thereafter, the anode and cathode are laminated so that the solid electrolyte composition is situated therebetween to provide for a solid electrolytic cell. The specifics of this construction are as follows:

A. The Cathode Current Collector

The cathode current collector employed is a sheet of aluminum foil having a layer of adhesion promoter attached to the surface of the foil which will contact the cathode so as to form a composite having a sheet of aluminum foil, a cathode and a layer of adhesion promoter interposed therebetween. The aluminum foil is preferably an alloy that is identified by either the industry specifications 1235-H19 (99.35% min. Al), or 1145-H19 (99.45% min. Al), and which is available from All Foils, Inc., Brooklyn Heights, Ohio. (Alternatively, aluminum mesh can be used as the current collector.)

The adhesion promoter layer is prepared as a dispersed colloidal solution in one of two methods. The first preparation of this colloidal solution for this example is as follows:

8.44 parts by weight of carbon powder (Shawinigan Black™—available from Chevron Chemical Company, San Ramon, Calif.)

33.76 parts by weight of a 25 weight percent solution of polyacrylic acid (a reported average molecular weight of about 90,000, commercially available from Aldrich Chemical Company—contains about 84.4 grams polyacrylic acid and 253.2 grams water)

57.80 parts by weight of isopropanol

In a preferred embodiment of the first method, an additional amount of water, e.g., 2–3 weight percent water based on the total weight of the colloidal solution, is incorporated to enhance coatability. Also, about 1 weight percent methyl ethyl ketone is added to the composition to enhance wettability of the aluminum.

The carbon powder and isopropanol are combined with mixing in a conventional high shear colloid mill mixer (Ebenbach-type colloid mill) until the carbon is uniformly dispersed and the carbon particle size is smaller than 10 µm. At this point, the 25 weight percent solution of polyacrylic acid is added to the mixer and further mixed for approximately 15 minutes. The resulting mixture is pumped to the coating head and applied by a reverse Gravure roller onto a sheet of aluminum foil about 9 in. (22.86 cm) wide and about 0.0005 in. (0.00127 cm) to about 0.001 in. (0.00254 cm) thick. After application, the solvent is evaporated by placing the mixture/foil into a conventional oven. After evaporation, an electrically-conducting adhesion-promoter layer of about 4–6 µm in thickness is formed. The aluminum foil is then cut to about 8 in. (20.32 cm) wide by removing approximately ½ in. (1.27 cm) from the sides with a conventional slitter so as to remove any uneven edges; the foil can then be further cut to the desired size.

The second preparation of this colloidal solution comprises mixing 25 lbs (11.35 kg) of carbon powder (Shawinigan Black™) with 100 lbs (45.4 kg) of a 25 weight percent solution of polyacrylic acid (average molecular weight of about 240,000, commercially available from BF Goodrich, Cleveland, Ohio, as Good-Rite K702—contains about 25 lbs (11.35 kg) polyacrylic acid and 75 lbs (34.05 kg) water) and with 18.5 lbs (8.399 kg) of isopropanol. Stirring is done in a 30 gallon (113.55 liters) polyethylene drum with a gear-motor mixer (e.g., Lighting Labmaster Mixer, model XJ-43, available from Cole-Parmer Instruments Co., Niles, Ill.) at 720 rpm with two 5 in. (12.7 cm) diameter A310-type propellers mounted on a single shaft. This wets down the carbon and eliminates any further dust problem. The resulting weight of the mixture is 143.5 lbs (65.149 kg) and contains some "lumps."

The mixture is then further mixed with an ink mill which consists of three steel rollers almost in contact with each other, turning at 275, 300, and 325 rpms respectively. This high shear operation allows particles that are sufficiently small to pass directly through the rollers. Those that do not pass through the rollers continue to mix in the ink mill until they are small enough to pass through these rollers. When the mixing is complete, the carbon powder is completely dispersed. A Hegman fineness of grind gauge (available from Paul N. Gardner Co., Pompano Beach, Fla.) indicates that the particles are 4–6 µm with the occasional 12.5 µm particles. The mixture can be stored for well over 1 month without the carbon settling out or reagglomerating.

When this composition is to be used to coat the current collector, an additional 55.5 lbs (25.197 kg) of isopropanol is mixed into the composition working with 5 gallon (18.925 l) batches in a plastic pail using an air powered shaft mixer (Dayton model 42231 available from Granger Supply Co., San Jose, Calif.) with a 4 in. (10.16 cm) diameter Jiffy-Mixer brand impeller (such as an impeller available as Catalog No. G-04541-20 from Cole Parmer Instrument Co., Niles, Ill.). Then, it is gear pumped through a 25 μm cloth filter (e.g., So-Clean Filter Systems, American Felt and Filter Company, Newburgh, N.Y.) and coated as described above.

B. The Cathode

The cathode is prepared from a cathodic slurry which, in turn, is prepared from a cathode powder as follows:

i. Cathode Powder

The cathode powder is prepared by combining 94.1±1.1 weight percent $LiMn_2O_4$ and 5.9±1.1 weight percent of carbon (Shawinigan Black™). About 100 grams of the resulting mixture is placed into a grinding machine (Attritor Model S-1 available from Union Process, Akron, Ohio) and ground for 30 minutes at 150 rpm. Afterwards, the resulting mixture is passed through a 200 mesh screen and then vacuum dried at 60° C. to produce a cathode powder with a water content of less than about 1000 ppm and preferably less than about 300 ppm.

ii. Cathode Slurry

A cathode slurry is prepared by combining sufficient cathode powder to provide for a final product having about 51.7 weight percent $LiMn_2O_4$. The slurry contains the following (in approximate weight percent):

| | |
|---|---|
| $LiMn_2O_4$ | 51.744% |
| Carbon | 6.456% |
| EPDM | 1.8% |
| (ethylene propylene diene monomer) | |
| Xylene | 40.0% |
| | 100% |

The method of preparing 100 grams of the cathode slurry is as follows:

1.8 grams of EPDM (Mooney viscosity of 26±5 and available as VISTALON™ 2504 (Exxon Chemicals Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide 51.744 grams of $LiMn_2O_4$ per 100 grams of cathode slurry and a sufficient amount of carbon (Shawinigan Black™) to provide 6.456 grams of total carbon per 100 grams of slurry are mixed in a double planetary mixer where the blend is stirred at 7.5 Hz and 25° C. The above EPDM-xylene solution is passed through 4A molecular sieves and then added to the $LiMn_2O_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 μm, more preferably 50–100 μm, and most preferably about 100 μm, over the current collector by a doctor blade, Meyer-rod, or by reverse roll coating. The cathode slurry/current collector is heated to remove the xylene.

C. Electrolyte 36.26 grams of propylene carbonate, 3.45 grams of trimethyl propyl triacrylate, 36.26 grams of ethylene carbonate, and 13.79 grams of urethane acrylate (Actilane SP023, available from Akcros Chemicals, Ltd., Manchester, England) are combined at room temperature until homogeneous. The resulting solution is optionally passed through a column of 4A molecular sieves to remove water and then the recovered solution is mixed at room temperature until homogeneous. If necessary, the ethylene carbonate can first be dissolved in propylene carbonate with heat.

At this point, 1.47 grams of polyethylene oxide film forming agent having a number average molecular weight of about 600,000 (available as Polyox WSR-205 from Union Carbide Chemicals and Plastics, Danbury, Conn.) is added to the above solution and then dispersed while stirring with a magnetic stirrer over a period of about 60–120 minutes. After dispersion, the solution is heated to between 60° and 65° C. with stirring until the film forming agent is dissolved. A thermocouple is placed at the edge of the vortex created by the magnetic stirrer to monitor solution temperature. The solution is cooled to a temperature of less than 48° C. and then 8.77 grams of $LiPF_6$ are added to the solution over a 120 minute period while thoroughly mixing to ensure a substantially uniform temperature profile throughout the solution. Cooling is applied as necessary to maintain the temperature of the solution at less than 48° C.

In one optional embodiment, the polyethylene oxide film forming agent is added to the solution via a mini-sieve, such as a 25 mesh mini-sieve that is commercially available as Order No. 57333-965 from VWR Scientific, San Francisco, Calif.

The resulting solution contains the following in approximate weight percent based on the total weight of the electrolyte solution (100 g):

| | |
|---|---|
| Propylene Carbonate | 36.26% |
| Ethylene Carbonate | 36.26% |
| Trimethylol propyl triacrylate (TMPTA) | 3.45% |
| Urethane Acrylate | 13.79% |
| $LiPF_6$ | 8.77% |
| PEO Film Forming Agent | 1.47% |
| Total | 100% |

This solution is then degassed to provide for an electrolyte solution wherein little, if any, of the $LiPF_6$ salt decomposes.

Optionally, the above solution which contains the prepolymer, the film forming agent, the electrolytic solvent and the $LiPF_6$ salt, is filtered to remove any solid particles or gels remaining in the solution. One suitable filter device is a sintered stainless steel screen having a pore size between 1 and 50 μm at 100% efficiency.

In an alternative embodiment, the electrolyte is prepared by the following steps using the same above described electrolyte components:

1. Check the moisture level of the urethane acrylate. If the moisture level is less than 100 ppm water, proceed to step 2. If not, then first dissolve the urethane acrylate at room temperature, <30° C., in the propylene carbonate and ethylene carbonate and dry the solution over 4A molecular sieves (Grade 514, 8–12 Mesh from Schoofs Inc., Moraga, Calif.) and then proceed to step 4.

2. Dry the propylene carbonate and ethylene carbonate over 4A molecular sieves (Grade 514, 8–12 Mesh from Schoofs Inc., Moraga, Calif.).

3. At room temperature, <30° C., add the urethane acrylate to the solvent prepared in step 2. Stir until the resin is completely dissolved. The solution should be clear and colorless.

4. Dry and optionally sift the polyethylene oxide film forming agent through a 25 mesh mini-sieve commercially available as Order No. 57333-965 from VWR Scientific, San Francisco, Calif. While stirring add the dried and pre-sifted polyethylene oxide film forming agent slowly to the solution. The polyethylene oxide film forming agent should be sifted into the center of the vortex formed by the stirring means at a controlled rate to avoid agglomerate formation. Addition of the polyethylene oxide film forming agent should be dispersive and, during addition, the temperature should be maintained at room temperature (<30° C.).

5. After final addition of the polyethylene oxide film forming agent, stir to ensure that the film forming agent is substantially dispersed.

6. Heat the mixture to 68° to 75° C. and stir until the film forming agent has melted and the solution has become transparent. Optionally, in this step, the mixture is heated to 65° to 68° C.

7. Cool the solution produced in step 6 and when the temperature of the solution reaches 40° C., add the $LiPF_6$ salt very slowly making sure that the maximum temperature does not exceed 55° C. and preferably does not exceed about 40° C.

8. Thereafter, the solution is stirred and degassed. The electrolyte solution is allowed to cool before usage.

9. Optionally, filter the solution through a sintered stainless steel screen having a pore size between 1 and 50 μm at 100% efficiency.

At all times, the temperature of the solution should be monitored with a thermocouple which should be placed in the vortex formed by the mixer.

Afterwards, the electrolyte mixture is coated by a slot die coater or a reverse roll flexographic coater to a thickness of about 25–50 μm onto the surface of the dried cathode slurry described above.

D. The Anode Current Collector

The anode current collector employed is a sheet of copper foil, about 0.33 mils (8.5 μm) to 0.5 mils (12.7 μm) thick, having a layer of adhesion promoter attached to the surface of the foil which will contact the anode so as to form a composite having a sheet of copper foil, an anode and a layer of adhesion promoter interposed therebetween. (Alternatively, copper mesh can be used as the current collector.)

The same adhesion promoter composition used with the cathode is employed with the anode.

E. The Anode

The anode is prepared from an anodic slurry which, in turn, is prepared from an anode powder as follows:

i. Anode Powder

The anode powder is prepared by combining about 93.81 weight percent of Mitsubishi Gas Carbon™ (a coke-like material) (Mitsubishi Petroleum Co. Ltd, Tokyo, Japan) and about 6.19 weight percent of carbon (Shawinigan Black™). About 100 grams of the resulting mixture is placed into a grinding machine (Attritor Model S-1) and ground for 30 minutes at 150 rpm Afterwards, the resulting mixture is passed through a 200 mesh screen and then vacuum dried at 60° C. to produce an anode powder with a water content of less than about 1000 ppm and preferably less than about 300 ppm.

ii. Anode Slurry

An anode slurry is prepared by combining sufficient anode powder to provide for a final product having about 54.6 weight percent of the Mitsubishi Gas Carbon. The slurry contains the following (in approximate weight percent):

| | |
|---|---|
| Mitsubishi Gas Carbon | 54.6% |
| Carbon | 3.6% |
| EPDM | 1.8% |
| (ethylene propylene diene monomer) | |
| Xylene | 40.0% |
| | 100% |

The method of preparing 100 grams of the anode slurry is as follows:

1.8 grams of EPDM (VISTALON™ 2504) are mixed in 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of anode powder sufficient to provide 54.6 grams of Mitsubishi Gas Carbon per 100 grams of anode slurry and a sufficient amount of carbon (Shawinigan Black™) to provide 3.6 grams of total carbon per 100 grams of slurry are mixed in a double planetary mixer where the blend is stirred at 7.5 Hz and 25° C. The above EPDM-xylene solution is passed through 4A molecular sieves and then added to the Gas Carbon and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The so-prepared anode slurry can be placed onto the adhesion layer of the current collector by coating a layer of slurry having a substantially uniform thickness of about 25–200 μm, more preferably 50–100 μm, and most preferably about 50 μm, over the current collector by a doctor blade, Meyer-rod, or by reverse roll coating. The anode slurry/current collector is then heated to remove the xylene. Therefore, the anode is subject to pre-lithiation as described above.

F. The Solid Electrolytic Cell

A sheet comprising a solid battery is prepared by laminating the anode composite with the electrolyte/cathode composite so that the electrolyte is positioned between the anode and cathode. Lamination is accomplished by minimal pressure.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method for fabricating an electrochemical cell which comprises the steps of:

(a) preparing a carbon anode in a process comprising of:
 (i) providing a carbon material that is capable of intercalating lithium metal; and
 (ii) prelithiating the carbon material with lithium metal;

(b) providing a cathode that comprises a lithiated compound; and (c) forming a solvent-containing electrolyte that is interposed between said anode and said cathode.

2. The method according to claim 1 wherein after step (a) of preparing the carbon anode the method further comprises the step of removing some or essentially all intercalated lithium metal from the carbon material.

3. The method according to claim 1 wherein the prelithiation step comprises:

positioning a prelithiation electrolyte between the carbon material and the lithium metal; and electrically connecting the carbon material to the lithium metal.

4. The method according to claim 1 wherein the prelithiation step comprises polarizing the carbon material in a galvanic cell.

5. The method according to claim 1 wherein the cathode includes material selected from the group consisting of $LiCoO_2$, $LiMn_2O_4$, and mixtures thereof.

6. The method according to claim 3 wherein the prelithiation step comprises of polarizing the carbon material in a galvanic cell.

7. The method according to claim 6 wherein the cathode includes material selected from the group consisting of $LiCoO_2$, $LiMn_2O_4$, and mixtures thereof.

8. The method according to claim 3 wherein the prelithiation step comprises of maintaining a constant potential between the carbon material and lithium metal.

9. The method according to claim 8 wherein the cathode includes material selected from the group consisting of $LiCoO_2$, $LiMn_2O_4$, and mixtures thereof.

10. An electrochemical cell fabricated by a process comprising the steps of:

(a) preparing a carbon anode in a process comprising of:
  (i) providing a carbon material that is capable of intercalating lithium metal; and
  (ii) prelithiating said carbon material with lithium metal;

(b) providing a cathode that comprises a lithiated compound; and (c) forming a solvent-containing electrolyte that is interposed between said anode and said cathode.

11. The electrochemical cell according to claim 10 wherein the process of fabricating the cell, after step (a) of preparing the carbon anode, further comprises the step of removing some or essentially all intercalated lithium metal from the carbon material.

12. The electrochemical cell according to claim 10 wherein the prelithiation step comprises of polarizing the carbon material in a galvanic cell.

13. The electrochemical cell according to claim 10 wherein the prelithiation step comprises:

positioning a prelithiation electrolyte between the carbon material and the lithium metal; and electrically connecting the carbon material to the lithium metal.

14. The electrochemical cell according to claim 10 wherein the cathode includes material selected from the group consisting of $LiCoO_2$, $LiMn_2O_4$, and mixtures thereof.

15. The electrochemical cell according to claim 13 wherein the prelithiation step comprises polarizing the carbon material in a galvanic cell.

16. The electrochemical cell according to claim 15 wherein the cathode comprises material selected from the group consisting of $LiCoO_2$, $LiMn_2O_4$, and mixtures thereof.

17. The electrochemical cell according to claim 13 wherein the prelithiation step comprises of maintaining a constant potential between the carbon material and lithium metal.

18. The electrochemical cell according to claim 17 wherein the cathode comprises material selected from the group consisting of $LiCoO_2$, $LiMn_2O_4$, and mixtures thereof.

19. The method according to claim 1, wherein the prelithiation step causes a portion of the carbon material to undergo an irreversible reaction with the lithium metal.

20. The method according to claim 3, wherein the prelithiation step causes a portion of the carbon material to undergo an irreversible reaction with the lithium metal.

21. The method according to claim 4, wherein the prelithiation step causes a portion of the carbon material to undergo an irreversible reaction with the lithium metal.

22. The method according to claim 8, wherein the prelithiation step causes a portion of the carbon material to undergo an irreversible reaction with the lithium metal.

23. The electrochemical cell according to claim 10, wherein the prelithiation step causes a portion of the carbon material to undergo an irreversible reaction with the lithium metal.

24. The electrochemical cell according to claim 12, wherein the prelithiation step causes a portion of the carbon material to undergo an irreversible reaction with the lithium metal.

25. The electrochemical cell according to claim 13, wherein the prelithiation step causes a portion of the carbon material to undergo an irreversible reaction with the lithium metal.

26. The electrochemical cell according to claim 17, wherein the prelithiation step causes a portion of the carbon material to undergo an irreversible reaction with the lithium metal.

27. The method according to claim 1, wherein the prelithiation occurs at a temperature above 23° C.

28. The method according to claim 1, wherein the prelithiation occurs at a temperature range of 50° C. to 100° C.

29. The method according to claim 3, wherein the prelithiation occurs at a temperature above 23° C.

30. The method according to claim 3, wherein the prelithiation occurs at a temperature range of 50° C. to 100° C.

31. The method according to claim 4, wherein the prelithiation occurs at a temperature above 23° C.

32. The method according to claim 4, wherein the prelithiation occurs at a temperature range of 50° C. to 100° C.

33. The method according to claim 8, wherein the prelithiation occurs at a temperature above 23° C.

34. The method according to claim 8, wherein the prelithiation occurs at a temperature from 50° C. to 100° C.

35. The electrochemical cell according to claim 10, wherein the prelithiation occurs at a temperature above 23° C.

36. The electrochemical cell according to claim 10, wherein the prelithiation occurs at a temperature from 50° C. to 100° C.

37. The electrochemical cell according to claim 12, wherein the prelithiation occurs at a temperature above 23° C.

38. The electrochemical cell according to claim 12, wherein the prelithiation occurs at a temperature from 50° C. to 100° C.

39. The electrochemical cell according to claim 13, wherein the prelithiation occurs at a temperature above about 23° C.

40. The electrochemical cell according to claim 13, wherein the prelithiation occurs at a temperature from 50° C. to 100° C.

41. The electrochemical cell according to claim 17, wherein the prelithiation occurs at a temperature above 23° C.

42. The electrochemical cell according to claim 17, wherein the prelithiation occurs at a temperature from 50° C. to 100° C.

* * * * *